United States Patent [19]
Tashima et al.

[11] Patent Number: 5,272,477
[45] Date of Patent: Dec. 21, 1993

[54] REMOTE CONTROL CARD AND REMOTE CONTROL SYSTEM

[75] Inventors: Toshihiro Tashima; Tomohiko Hayakawa, both of Kyoto, Japan

[73] Assignee: Omron Corporation, Kyoto, Japan

[21] Appl. No.: 873,356

[22] Filed: Apr. 21, 1992

Related U.S. Application Data

[63] Continuation of Ser. No. 540,694, Jun. 20, 1990, abandoned.

[30] Foreign Application Priority Data

Jun. 20, 1989 [JP]  Japan ................ 1-157041

[51] Int. Cl.⁵ .......................... F24F 11/053
[52] U.S. Cl. .................. 340/870.16; 340/825.69; 340/825.72; 340/870.17; 236/51
[58] Field of Search ........ 340/870.16, 870.17, 340/501, 825.69, 825.72, 825.06; 364/557; 236/51

[56] References Cited

U.S. PATENT DOCUMENTS

| | | | |
|---|---|---|---|
| 4,734,871 | 3/1988 | Tsunoda et al. | 236/51 X |
| 4,824,012 | 4/1989 | Tate | 236/51 X |
| 4,860,950 | 8/1989 | Reeser et al. | 236/51 |
| 4,969,508 | 11/1990 | Tate et al. | 236/51 X |

FOREIGN PATENT DOCUMENTS

| | | | |
|---|---|---|---|
| 60-228842 | 11/1985 | Japan | 236/51 |
| 61-195232 | 8/1986 | Japan | 236/51 |
| 62-131155 | 6/1987 | Japan | 236/51 |
| 63-194155 | 8/1988 | Japan | 236/51 |

Primary Examiner—Donald J. Yusko
Assistant Examiner—Michael Horabik
Attorney, Agent, or Firm—Dickstein, Shapiro & Morin

[57] ABSTRACT

A remote control card having a temperature sensor for detecting and measuring an ambient temperature, an inputter for setting a desired temperature, a transmitter to transmit a temperature signal from the temperature sensor and a temperature signal set by the inputter to a remote place through its transmission and reception antenna, an instruction signal generator for generating an instruction signal for automatic adjustment of wind direction, wind velocity or temperature when the difference between the ambient temperature and a predetermined reference temperature, or between the set temperature and reference temperature exceeds a predetermined value, and a display for indicating the ambient temperature measured by the temperature sensor, the temperature set by the inputter, or a temperature inputted from an external signal transmitter and receiver. There is also a controller for use with the above card.

9 Claims, 8 Drawing Sheets

1

REMOTE CONTROL CARD AND REMOTE CONTROL SYSTEM

This application is a continuation of application Ser. No. 07/540,694 filed Jun. 20, 1990, now abandoned.

BACKGROUND OF THE INVENTION

1. Field of the Invention

The present invention relates to a remote control card for remote control of room temperature, bath temperature, etc. and to a remote controller.

2. Brief Description of the Prior Art

The conventional system for detecting interior temperature of a room and automatically adjusting thermal energy output of an air conditioner comprises, as illustrated in FIG. 8, a controller sensor unit 30 connected to the air conditioner 40 and equipped with a display means 31 and an operation panel 32. The underlying principle of the system is that a person in the room walks to the operation panel 32 and sets a desired temperature there so that the interior atmosphere of the room will be accordingly controlled by the air conditioner 40. However, there is usually some distance from the location A of the person to the location of the controller sensor 30 of the air conditioner 40. The temperature actually established by the air conditioner 40 is often different from the temperature desired by the person. In other words, the room temperature may be too high or too low depending on the location of the person and it is, thus, difficult to exactly control the ambient air temperature at the location of the person.

Furthermore, there is inconvenience that in order to change the room temperature, the person must walk to the controller sensor 30.

OBJECTS OF THE INVENTION

It is an object of the present invention to provide a remote control card which is easy to use and enables users to control the ambient temperature easily and accurately at the level he desires while he keeps staying where he is.

It is another object of the invention to provide a remote controller for use in association with the above-mentioned remote control card.

SUMMARY OF THE INVENTION

The above objects have been accomplished by the following modes of the present invention.

In a first embodiment, the remote control card comprises temperature sensor means for detecting ambient temperature, input means for setting a desired temperature, means for transmitting a temperature signal from the temperature sensor means and a temperature signal generated by the input means to a remote location through its transmission and reception antenna, instruction signal generating means for generating an instruction signal for automatic adjustment of wind direction, wind velocity or temperature when a difference between the ambient temperature and set temperature, between the ambient temperature and a predetermined reference temperature, or between the set temperature and reference temperature exceeds a predetermined value, and display means for indicating the ambient temperature measured by the temperature sensor means, the temperature set by the input means, or an input temperature from an external signal transmission and reception means.

In a second embodiment, the remote controller comprises transmission and reception means equipped with a transmission and reception antenna as disposed at a distance from the remote control card and adapted to sense the ambient temperature of its location and transmit a signal representing the temperature to the transmission and reception means of the card, control means for controlling the wind direction, velocity or temperature according to an instruction signal from the instruction signal generating means of the card, and a heat output controller connected to the control means through a wire harness and equipped with built-in means for controlling the adjustment of wind direction, velocity or temperature by the control means.

In a third embodiment, the remote controller for use in association with a plurality of units of the remote control card wherein the wind direction, velocity or temperature is controlled according to signals from the plurality of units of the card.

Other objects and advantages of the invention will become apparent upon perusal of this specification and reference to the accompanying drawings.

DETAILED DESCRIPTION OF THE PREFERRED EMBODIMENTS

The preferred examples of the remote control card and remote controller of the present invention will be described in detail below, referring to the accompanying drawings.

FIGS. 1 through 4 each illustrates a relationship of a remote control card and a remote controller in a first embodiment of the invention. The like numerals are used to indicate the like parts of the prior art system described hereinbefore and explanations relevant to these parts are not given.

Figure 1:
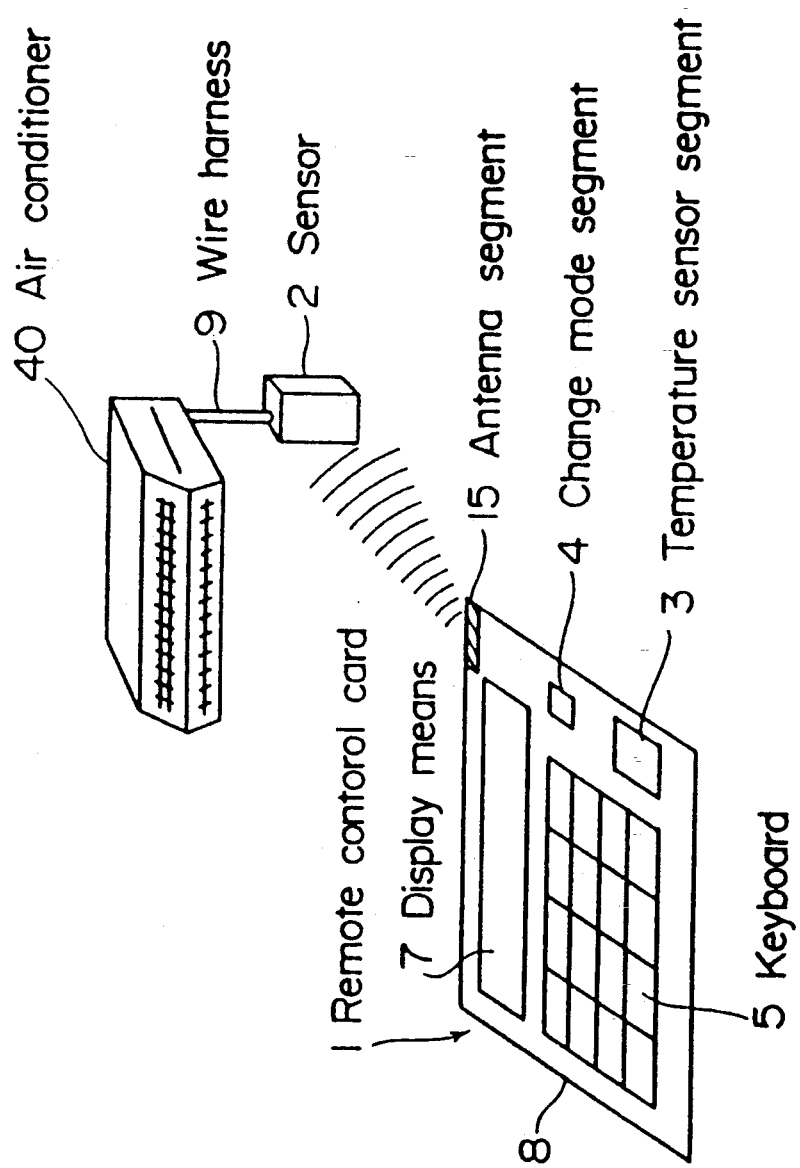
FIG. 1 is a perspective view showing a remote control card according to a first embodiment of the invention.

Referring to FIG. 1, a remote control card 1 and a non-contacting card sensor unit 2 as means for controlling an external air conditioner 40 are independently located. The card 1, which is an IC card, comprises a temperature sensor segment 3 adapted to detect and measure ambient temperature, a change mode segment 4, a keyboard segment 5 for setting a desire temperature, an antenna segment 15 for transmission and reception of a signal representing the temperature set on the keyboard segment 5, and a display means 7 comprised of LCD etc. in an integral housing 8. On the other hand, the non-contacting card sensor unit (hereinafter referred to briefly as the sensor unit) 2 is connected to the air conditioner 40 through a wire harness 9.

Figure 2:
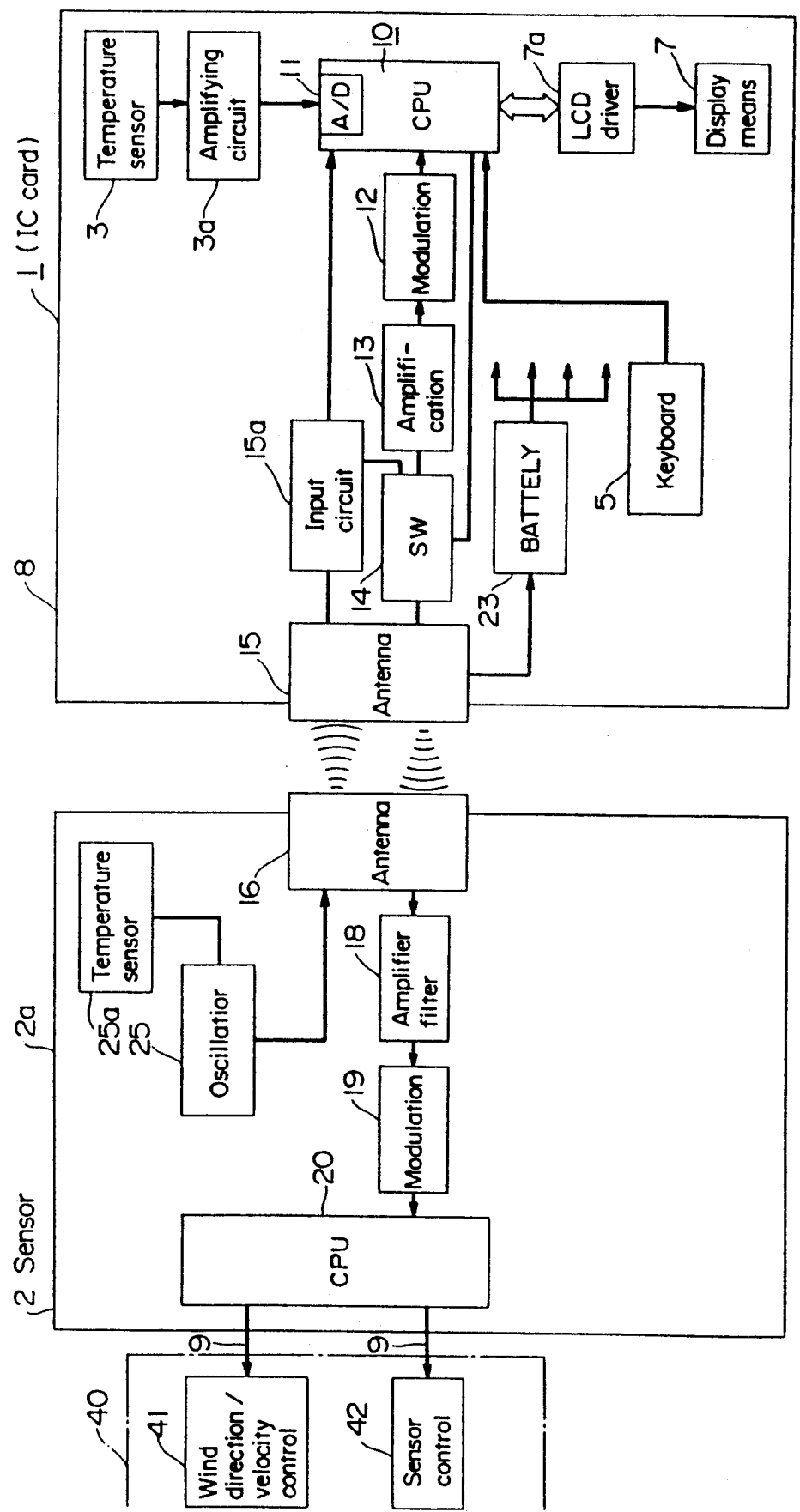
FIG. 2 is a block diagram of the remote control card and associated remote controller according to the invention.

Now, the circuits of the IC card 1 and sensor unit 2 are explained referring to FIG. 2. The housing 8 of the IC card 1 contains the temperature sensor 3 adapted to detect and measure the ambient temperature and this temperature sensor 3 is connected to a CPU 10 through an amplifying circuit 3a which amplifies an analog signal, and an A/D converter 11 which converts the analog signal to a digital signal. Connected to this CPU 10 are a keyboard segment 5, at which the desired temperature can be set, and display means 7, which can for example be comprised of LCD etc., through an LCD driver circuit 7a.

The control action of the CPU 10 is explained below. The ambient temperature measured by the temperature sensor 3 in the form of an analog signal is fed to the A/D converter 11 of CPU 10 where it is converted to a digital signal representative of the ambient temperature for indication on the display means 7.

The CPU 10 is further so designed that when the desired temperature is entered from the keyboard segment 5, it outputs an instruction to the display means 7 to indicate the set temperature and at the same time controls the antenna segment 15, which is connected thereto through a modulation circuit 12, an amplifying circuit 13 and a switch 14, so that a signal representing the set temperature is transmitted to the antenna 16 of the sensor unit 2.

The CPU 10 is connected to the switch 14, too, in such a manner that when a difference between the reference temperature (for example, 22° C.) stored in a built-in memory of the CPU 10 and the ambient temperature from the temperature sensor 3 reaches a predetermined value, the CPU 10 automatically turns on the switch 14 so that the temperature difference does not become larger than the predetermined value.

The above switch 14 is also connected to an input circuit 15a for the temperature signal fed to the antenna segment 15.

To transmit a desired temperature signal from the antenna segment 15, the keyboard segment 5 is manipulated to input the temperature signal into the CPU 10. The CPU 10 then turns on the switch 14. The temperature signal is fed to the antenna segment 15 through the modulation circuit 12 and amplifying circuit 13 and is transmitted to the antenna 16 of the sensor unit 2. During this operation, the switch 14 keeps the input circuit 15a OFF. The ambient temperature at the sensor unit 2 is detected by a temperature sensor 25a and the resulting signal is transmitted from an antenna 16 connected to an oscillator 25 to the CPU 10 of the IC card 1 through its antenna segment 15 and input circuit 15a. A portion of the signal is outputted to the switch 14 through the input circuit 15a, whereby the switch 14 is forced OFF. Thus, the switch 14 has been so designed that it is automatically switched OFF on arrival of the temperature signal at the input circuit 15a through the antenna segment 16 of the sensor unit 2 and, in this state the CPU 10 does not output a temperature signal. The oscillator 15 has an additional function of confirming the transmission distance from the IC card 1. Indicated at 23 is a battery power source for the IC card 1.

Thus, the signals representing the reference temperature, measured temperature and set temperature memorized in the CPU 10 of the IC card 1 are transmitted to the antenna 16 of sensor unit 2 through the modulation circuit 12, amplifying circuit 13, switch 14 and antenna 15 of the IC card 1.

The operation of the remote control IC card described above is explained below, referring to the flow chart of FIG. 3.

Thus, on depression of a change mode segment 4, which works as a start switch too, the processing routine starts (step 97) and if the "carrier detection OK" is affirmative (step 99), initial setting is performed (step 100).

If the "carrier detection OK" is negative (step 98), the starting condition (step 97) resumes.

After initial setting at step 100, the reference temperature Tx=22° C. memorized in CPU 10 of the IC card 1 is automatically set. Then, the ambient temperature around the IC card 1 which is inputted from the temperature sensor segment 3 is read at step 102 and displayed on display means 7 at step 103. Here, the holder of the IC card 1 can find a difference between the reference temperature and the ambient temperature.

Then, if the ambient temperature at the sensor segment 3 is 15° C. and the holder of the IC card 1 wishes to increase the ambient temperature around the IC card up to, for example, 20° C., he enters this desired temperature on the keyboard 5.

Then, it is inquired whether a desired temperature has been entered from the keyboard 5 at step 104 and if the result is affirmative (YES), the CPU 10 proceeds to step 105 where it reads the set temperature and outputs the data to the display means 7 for indication on the display means 7 (step 106).

If no input is available from the keyboard 5 in step 104, the CPU 10 proceeds to step 107. At step 107, the ambient temperature of the air conditioner 40 is read into the CPU 10 through the input circuit 15a. The CPU 10 reading this measured ambient temperature Ty of the air conditioner 40 instructs the display means 7 to display Ty at step 108.

Therefore, the holder of the IC card can find the difference between the ambient temperature of the air conditioner 40 and the ambient temperature of the IC card 1.

At step 109, the temperature difference Tc between the set temperature Tx and ambient temperature Ty is calculated and in step 110 if the absolute value of this temperature difference is more than 2° C. (YES), the CPU 10 proceeds to step 111. At step 111, the Card No. of the IC card 1 and the temperature difference are transmitted to the sensor 2, and the air conditioner 40 is then controlled to change wind direction or velocity in response to the transmitted temperature difference. At step 112, the CPU 10 stands by and the initial setting of step 100 resumes.

On the other hand, if the absolute value of temperature difference Tc is less than 2° C., the CPU automatically proceeds to step 112 and stands by and the initial setting of step 100 resumes. Incidentally, a difference of less than 2° C. is generally considered to be a difference which is hardly felt by man but the value of 2° C. is not an exclusive choice.

Thus, by means of this IC card 1, the person in the room can find the exact difference between the ambient temperature of the air conditioner 40 and that of the IC card 1 he holds and transmit an instruction signal to the air conditioner 40 so that the temperature setting can be changed to the desired level. Furthermore, since this IC card 1 portable, the person can carry it about wherever he goes with the utmost convenience. Furthermore, the card 1 can be utilized as a thermometer as well.

A second embodiment of the present invention is described in detail below, referring chiefly to FIG. 2. It should be understood that the like numerals are used to denote the like parts of the first embodiment and that explanations relevant to these parts are omitted.

Referring to FIG. 2, the internal circuit of a sensor unit 2 is accommodated in a housing 2a and a modulation signal (temperature difference signal) transmitted from the antenna segment 15 of the IC card 1 is fed to a CPU 20. According to this modulation signal, the CPU 20 outputs a control signal to a wind direction/velocity control 41 or a temperature control 42 of the air conditioner 40 through a wire harness 9.

Indicated at 25 is an oscillator adapted to generate carrier waves and transmit the information on the ambient temperature around the antenna 16 of the sensor unit 2 to the IC card 1. This ambient temperature data is stored in a built-in memory of the CPU 10 of the IC card 1 through the input circuit 15a and also displayed on display means 7 through a driver circuit 7a. It can be seen from FIG. 5, which shows the interconnection of the IC card, sensor unit 2 and air conditioner 40, that the IC card 1 and the sensor unit 2 are coupled without physical contact while the sensor unit 2 and the air conditioner 40 are coupled via the wire harness 9.

The air conditioner 40a has a built-in wind direction/velocity control 41 and a built-in temperature control 42, both of which can be switched ON and OFF by means which are described hereinafter according to the type of output from the sensor 2.

Figure 4:
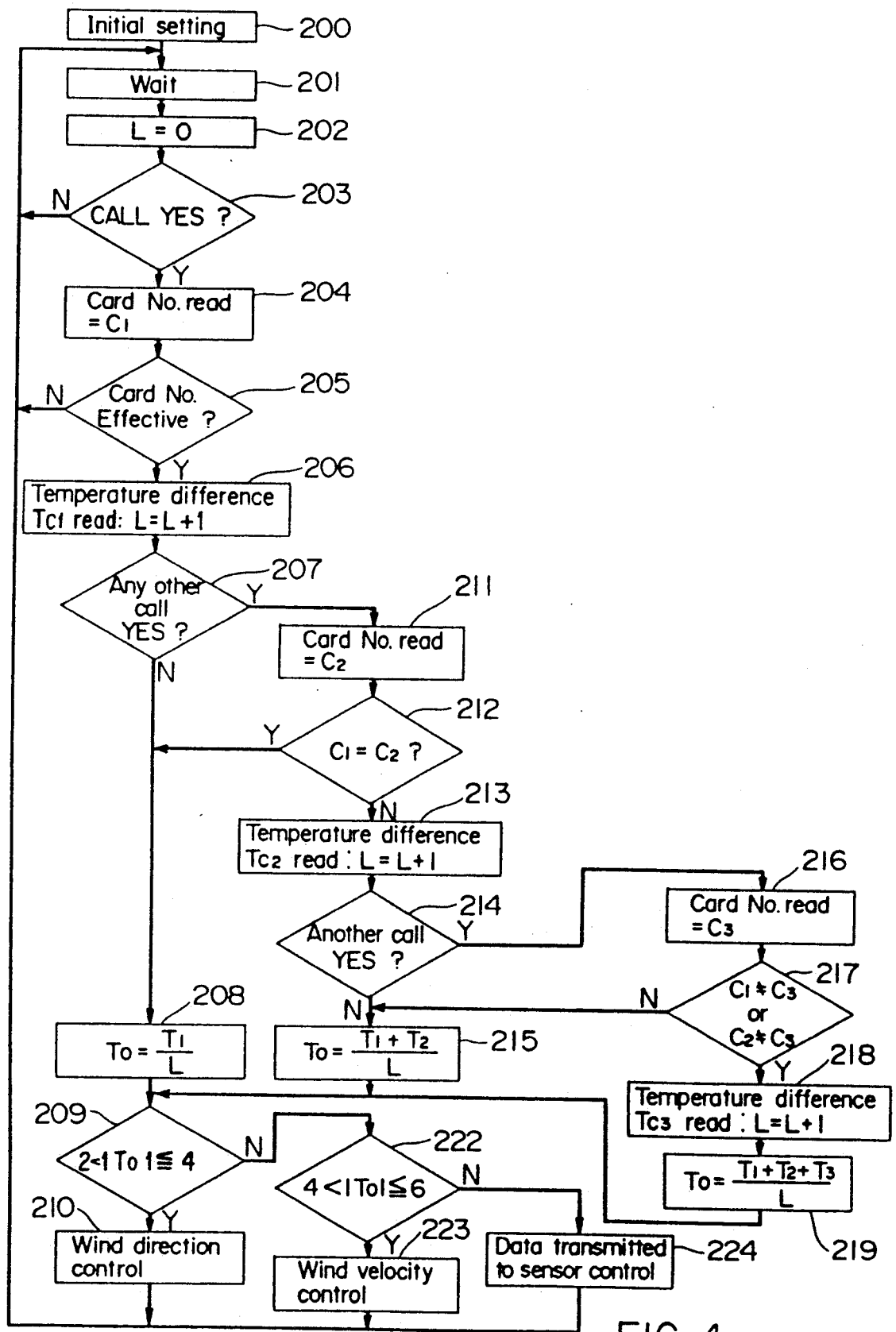
FIG. 4 is a flow chart of an algorithm for a second embodiment according to the invention.

The action of the sensor 2 is explained below, referring to the algorithm shown in FIG. 4.

When the power source of the sensor 2 is switched ON, initial setting is established at step 200. Step 201 is a wait step. Step 202 initializes the number of calls (L) to zero. If there is no transmission of temperature difference Tc from the antenna segment 15 of the IC card 1 to the antenna 16 of the sensor unit 2 within the waiting time (CALL NO), the CPU returns to the initial setting of step 200.

If the result at step 203 is CALL YES, the CPU 20 proceeds to step 204, where it reads the Card No. of IC card 1.

Then, an enquiry is made at step 205 to see whether the IC card 1 has been registered and if the result is NO, the CPU 20 returns to the initial setting of step 200. If the result is YES at step 205, the CPU 20 reads the temperature difference $Tc_1$ at step 206. If there is no other CALL at step 207, the CPU 20 proceeds to step 208. At step 208, the change temperature $$\left( To = \frac{Tc_1}{L} \right)$$

is calculated.

If the absolute value of this change temperature To is $2° < TO < 4°$ at step 209, the CPU 20 proceeds to step 210 where it outputs a wind direction control instruction to the air conditioner 40 and, then, returns to the initial setting of step 200.

If there is a CALL from another IC card 1 at step 207, a comparison is made (step 212) and if the temperature difference is equal to the temperature difference of the initial IC card 1, the CPU 20 proceeds to step 208.

If the result at step 212 is that there is a temperature difference from another IC card 1, the CPU 20 proceeds to step 213, to read the second temperature difference $Tc_2$ and increase the number of calls. Then, if there is no other CALL at step 213, the change temperature To from the second and first IC cards $$\left( To = \frac{Tc_1 + Tc_2}{L} \right)$$

is calculated at step 215. The CPU 20 then proceeds to step 209.

If there is a CALL from a third IC card 1 (YES) at step 214, the CPU reads the Card No. of the third IC card 1 (step 216) and if the temperature difference Tc of the third IC card 1 is equal to that of the second IC card 1 at step 217, the CPU returns to step 215.

If the temperature difference Tc values of the three IC cards are different at step 217, the CPU reads in the temperature difference Tc of the third IC card 1 at step 218 and calculates $$\left( To = \frac{Tc_1 + Tc_2 + Tc_3}{L} \right)$$

at step 219.

If at, step 209, the change temperature To is $2° C. < |Tc_o| \leq 4° C.$, the wind direction control of the air conditioner 40 is carried out (step 210). If the change temperature $Tc_o$ is $4° C. < To < 6° C.$ (step 222) the wind velocity control of the air conditioner 40 is carried out (step 223) and the CPU returns to initial setting of step 200. If the change temperature is $/To/ > 6° C.$ at step 222, the CPU 20 transmits a control signal to the temperature control 42 of the air conditioner 40 (step 224) and the initial setting of step 200 resumes.

Thus, in the second embodiment of the invention, there is provided a sensor unit 2 independently of the IC card 1 and the holder of the IC card 1 can control the sensor unit 2 attached to the air conditioner 40 which is located at a distance. Thus, he can assure himself of the desired temperature according to the reference temperature and ambient temperature and set the desired temperature at the keyboard segment 5.

In this manner, the holder of the IC card 1 can accurately control the air conditioner without walking to it.

Figure 5:
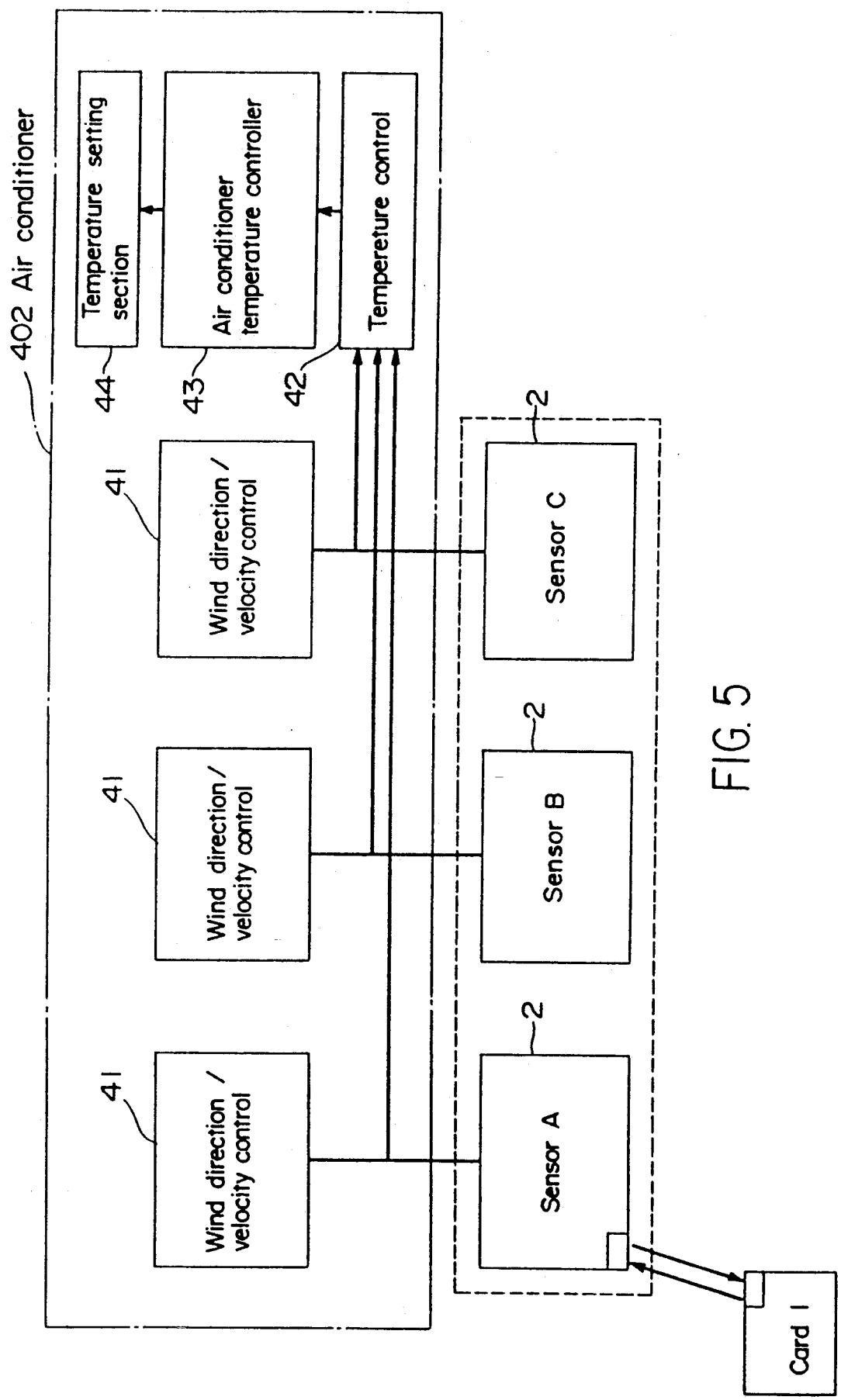
FIG. 5 is an overall circuit diagram of a third embodiment of the invention.
Figure 6:
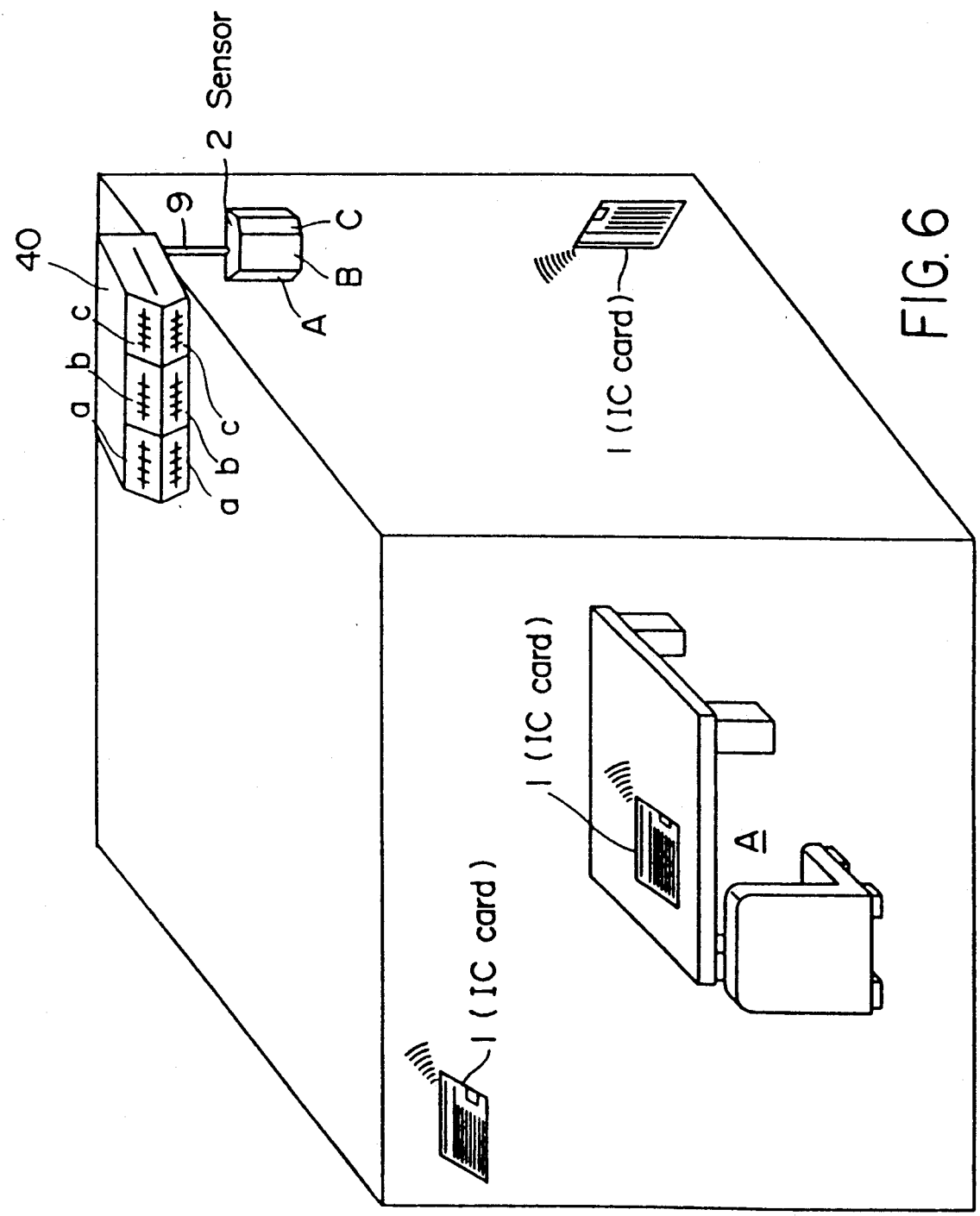
FIG. 6 is a perspective view showing the remote control system of FIG. 5.
Figure 7:
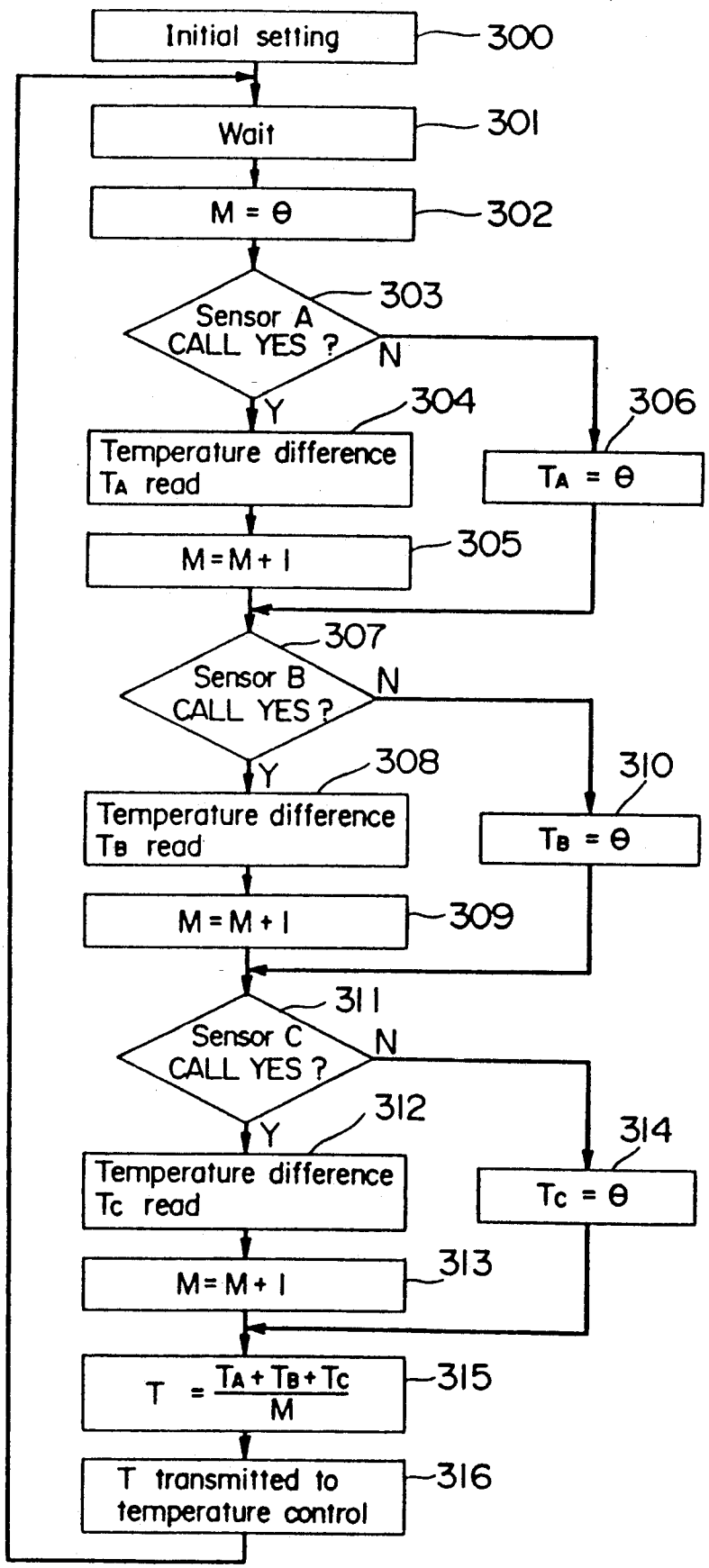
FIG. 7 is a flow chart showing an algorithm for temperature control by the system of FIG. 5.
Figure 8:
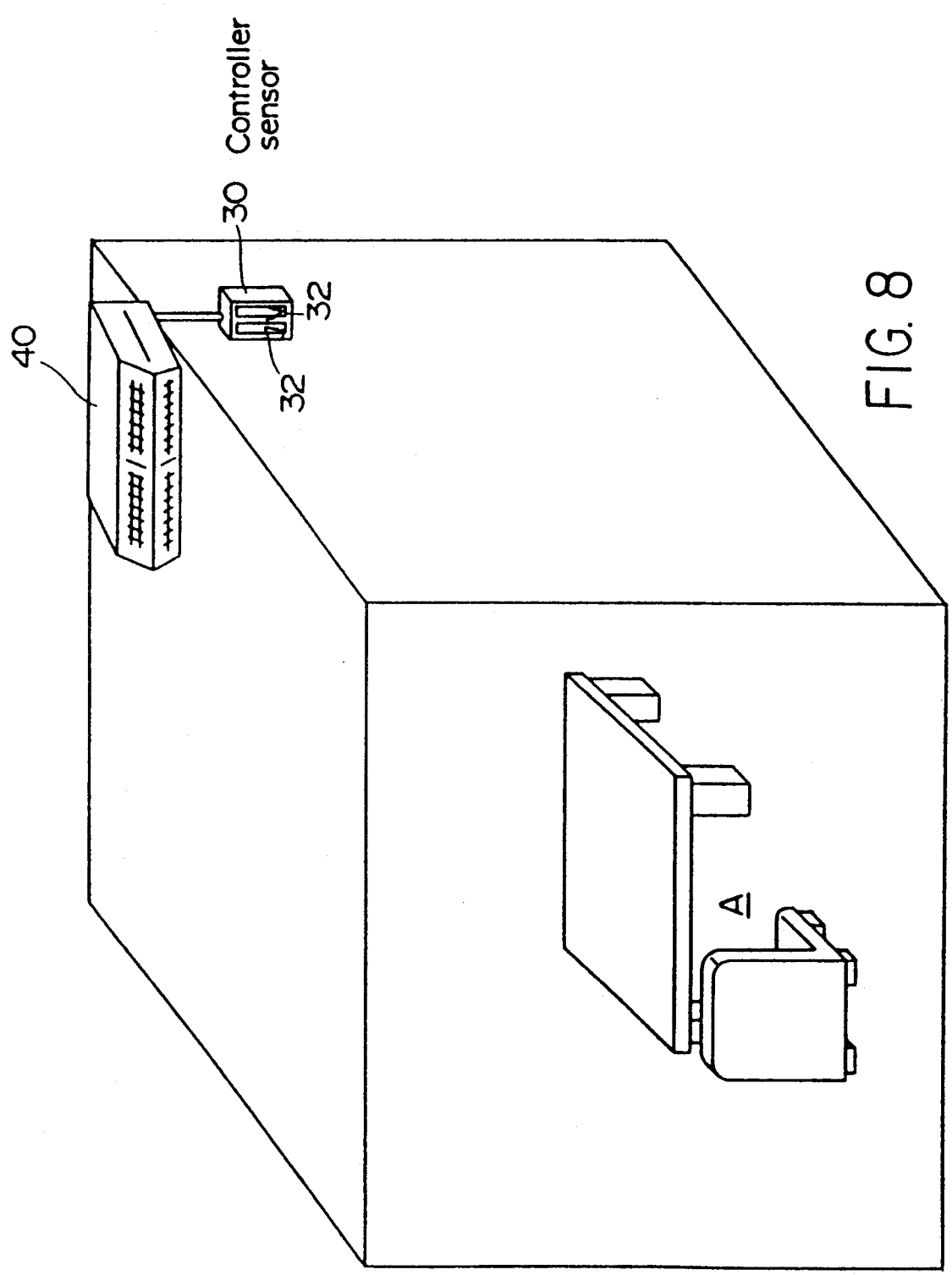
FIG. 8 is a perspective view showing the prior art system.

FIG. 5 through 7 show a third example of the remote control card and remote controller according to the invention, where the like numerals are used to denote the like parts of the first and second embodiments. In this third embodiment, a plurality of IC cards 1 are disposed at different locations. As illustrated, a total of three IC cards 1 are disposed facing the three antenna segments A, B and C of the sensor unit 2.

In FIG. 6, each of these antenna segments A, B and C is disposed in directionality to each of the IC cards 1 and the CPU 20 of the sensor unit 2 controls the air conditioner connected thereto via the wire harness 9 in such a manner that the louvers a, b and c of the air conditioner 40 are directed toward the respective IC cards 1.

As shown in FIG. 5, the air conditioner 40 includes a temperature control 42 and a plurality of wind direction/velocity controls 41 . . . which are controlled by CPUs 20 of the respective sensors 2. The temperature control 42 is connected to a temperature controller 43. These sensors 2 detect the temperatures set according to the ambient temperatures at different locations, and according to the change temperature signals, the wind direction/velocity or temperature of the air conditioner 40 is controlled appropriately so as to adjust the ambient temperatures at the locations of the IC cards 1.

Figure 3:
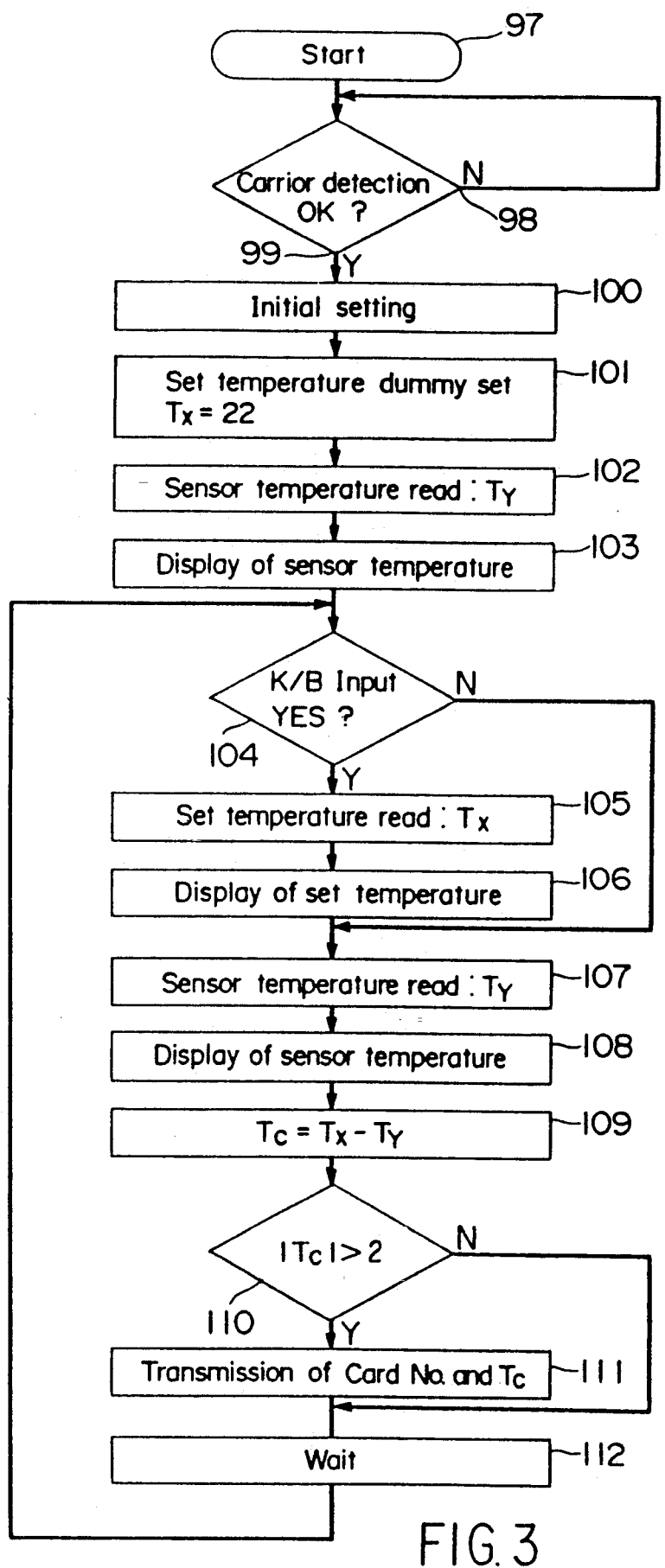
FIG. 3 is a flow chart of an algorithm for the remote control card according to the invention.

Thus, in the third embodiment of the invention, control signals from the CPUs 20 of the sensor units 2 are processed independently for the respective IC cards 1 as shown in FIG. 3, each according to the temperature difference between the ambient temperature and the set temperature or between the ambient temperature and the reference temperature at the CPU of the IC card 1. When the temperature difference is not significant, adjustment of the ambient temperature is made by wind direction control in the wind direction/velocity control 41. When the temperature difference is relatively large, the ambient temperature is adjusted by change of wind velocity.

When the temperature difference is so large as to require a great deal of adjustment, the adjustment is made by the temperature controller 42 and temperature setting section 44 of the air conditioner. FIG. 7 is a flow chart showing the control of temperature by this temperature control 42. The processing routine is explained below.

First, as the power source of the air conditioner 40 is switched ON, initial setting (step 300) is established. Then, the sequence waits at step 301. If, after a predetermined waiting time the number of calls (M) is initialized to zero at step 302. If there is a CALL for the temperature control segment 42 of a IC card 1 at A of the sensor unit 2 at step 303, the air conditioner temperature controller 43 of the air conditioner 40 reads the temperature difference TA at step 304. If there is no CALL for the temperature control segment 42 of the IC card, the temperature difference $T_A$ is set to zero at step 306.

At step 305, the sequence waits till a lapse of a predetermined time. Then, if there is no CALL for the temperature control segment 42 at step 303, the sequence proceeds to step 307. At steps 307 to 310, another temperature controller 42 and at steps 311 to 314, another temperature controller 42 are subjected to the same search as above and the change temperature To based on averaging of the data is set (step 315). The change temperature To thus set is fed to the air conditioner temperature controller 43 at step 316 and this controller 43 outputs an instruction to change the set temperature to To to the temperature setting section 44.

Then, the sequence returns to the initial setting of step 300.

The construction of the third embodiment is described above. Here, the ambient temperatures of a plurality of IC cards disposed in various places are accurately controlled so that the optimum temperature distribution can be established even in a spacious room.

It should be understood that while the foregoing description is directed to the application of the heat output control principle of the invention to the air conditioner, the above embodiments are by no means limited to such applications but can be utilized for establishment of the optimum temperature distribution of a bath or the like.

Thus, in the first embodiment of the invention, the sensor means for measuring an ambient temperature, input means for setting a desired ambient temperature, transmission and reception means for transmitting a signal representing the temperature set by the input means to an external heat output controller located at a distance through its antenna means, and display means for indicating any of the temperature measured by the temperature sensor means, the temperature set by the input means, and the ambient temperature at the location of the transmission and reception means of the external heat output controller are all packaged in a single card. Therefore, the convenience of use is remarkably increased. Moreover, the card can be utilized as a thermometer as well.

The second embodiment of the invention comprises, as disposed independently of the remote control card 1, signal reception means for receiving a temperature signal from the remote control card and temperature control means for controlling the heat output controller according to the temperature signal. Therefore, the difference between the ambient temperature of the place where the person is located and the ambient temperature of the place where the heat output controller is located is automatically ascertained, with the result that one can easily and accurately set the desired temperature without changing one's location.

In accordance with the third embodiment of the invention which employs a plurality of units of the remote control card, the wind direction, velocity and temperature of the heat output controller can be controlled according to the information from such units of the card so that a still more comfortable environment can be established.

The above description and the accompanying drawings are merely illustrative of the application of the principles of the present invention and are not limiting. Numerous other arrangements which embody the principles of the invention and which fall within its spirit and scope may be readily devised by those skilled in the art. Accordingly, the invention is not limited by the foregoing description, but is only limited to the scope of the appended claims.

What is claimed is:

1. A remote control card comprising:
    temperature sensor means for detecting and measuring a first ambient temperature at the remote control card;
    input means for setting a desired temperature;
    card transmitting means for transmitting a signal derived from the temperature signal from the temperature sensor means, the desired temperature set by the input means, and a second ambient temperature measured at a remote place to an external transmission and reception means; and
    display means for indicating the first ambient temperature measured by the temperature sensor means, the temperature set by the input means, or the second ambient temperature measured at a remote place.

2. A remote control card as in claim 1, further comprising:
    card receiving means for receiving a signal transmitted by an external signal transmission means corresponding to the second ambient temperature.

3. A remote control card as in claim 1, further comprising:
    switching means for turning off the card transmitting means when the card receiving means is receiving a signal.

4. A remote control system comprising:

a first transmission and reception means equipped with a transmission and reception antenna located at a distance from a remote control card and adapted to sense an ambient temperature of a location of said first transmission and reception means;

a second transmission and reception means on the remote control card;

control means for controlling the wind direction, velocity and temperature in response to a first signal from the second transmission means of the card wherein the signal is derived from the ambient temperature of the remote control card and an ambient temperature measured at the control means; and a heat output controller connected to the control means through a wire harness and equipped with built-in means for controlling the wind direction, wind velocity, or temperature according to the control means.

5. A remote control system as in claim 4, wherein:

the card comprises input means for setting a desired temperature; and the first signal from the card is the calculated difference between the ambient temperature of the remote control card and the temperature signal set by the input means.

6. A remote control system as in claim 4, wherein the first transmission and reception means transmit the ambient temperature measured at the control means to the remote control card.

7. A remote control system as in claim 6, wherein the remote control card comprises switching means for turning off the card transmitting means when the card receiving means is receiving a signal.

8. A remote controller as in claim 4, wherein there are a plurality of the remote control cards and the control means controls the wind direction, velocity and temperature in response to a signal from at least one of the plurality of remote control cards.

9. A remote controller as in claim 8, wherein there are a plurality of built-in means for controlling the wind direction, each of said built-in means being directed to a position of one of the plurality of control cards.

* * * * *